(Model.)

E. J. CORSER.
SEED DRILL.

No. 341,373. Patented May 4, 1886.

WITNESSES
H. G. Phillips.
O. W. Allison.

INVENTOR
E. J. Corser,
by Geo. B. Selden,
Attorney (Model.)
E. J. CORSER.
SEED DRILL.
No. 341,373. Patented May 4, 1886.
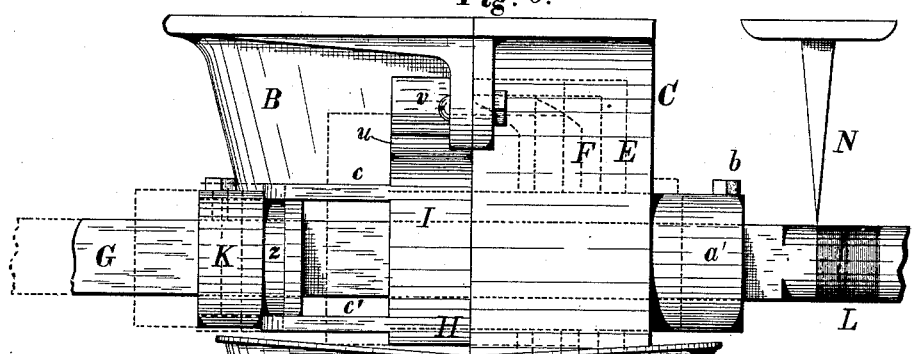
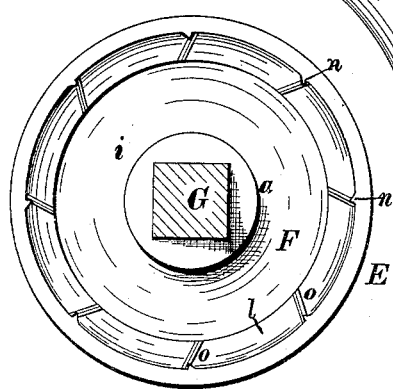
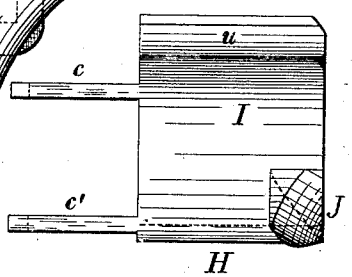
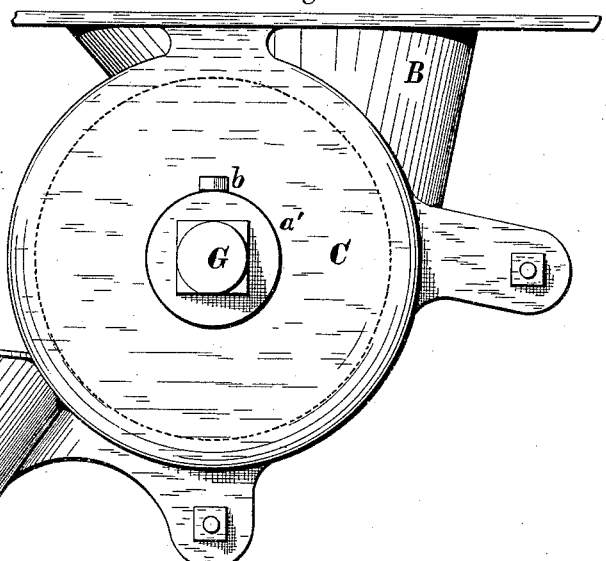
WITNESSES
H. G. Phillips.
C. W. Allison.
INVENTOR
E. J. Corser
by Geo. B. Selden,
Attorney (Model.) 3 Sheets—Sheet 3.
E. J. CORSER.
SEED DRILL.
No. 341,373. Patented May 4, 1886.
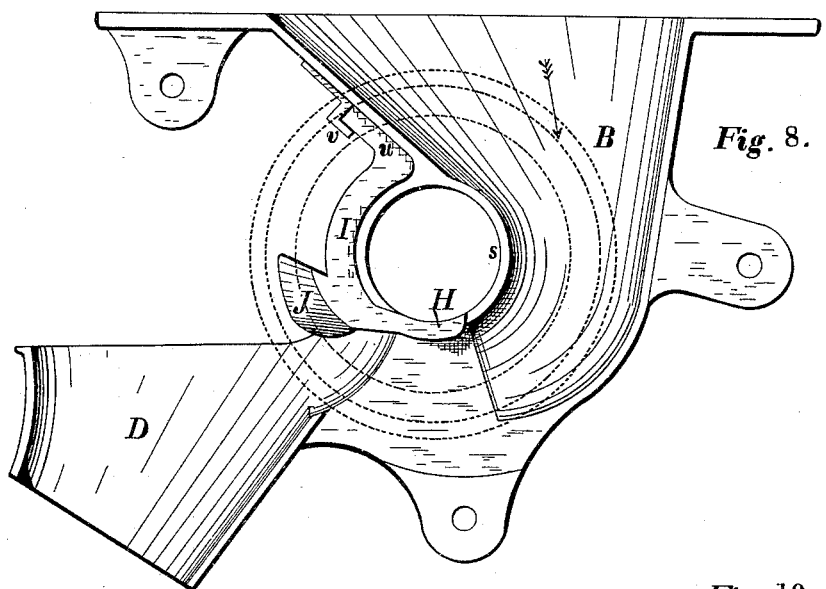
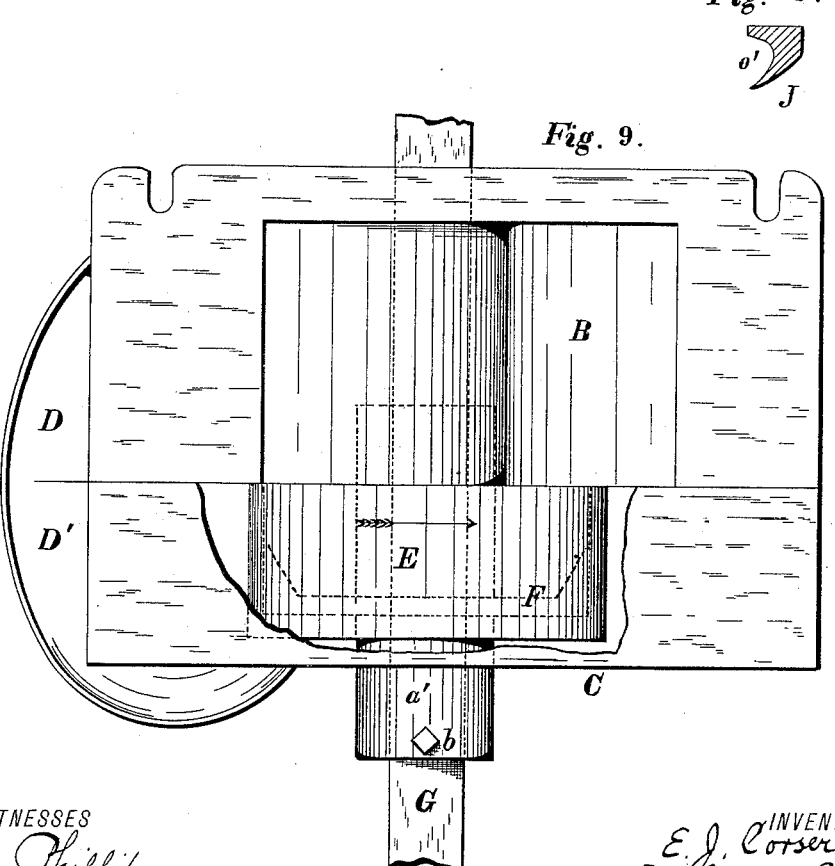
WITNESSES
H. G. Phillips.
O. W. Allison.
INVENTOR
E. J. Corser,
by Geo. B. Selden,
Attorney

UNITED STATES PATENT OFFICE.

EDSON J. CORSER, OF MACEDON, NEW YORK, ASSIGNOR OF ONE-HALF TO SILAS N. GALLUP, OF SAME PLACE.

SEED-DRILL.

SPECIFICATION forming part of Letters Patent No. 341,373, dated May 4, 1886.

Application filed December 9, 1885. Serial No. 185,107. (Model.)

*To all whom it may concern:*

Be it known that I, EDSON J. CORSER, of Macedon, Wayne county, New York, have invented certain Improvements in Seed-Drills, of which the following is a specification, reference being had to the accompanying drawings.

My invention relates to certain improvements in seed-drills, which improvements are fully described in the following specification, and the novel features thereof specified in the annexed claims.

Figure 1:
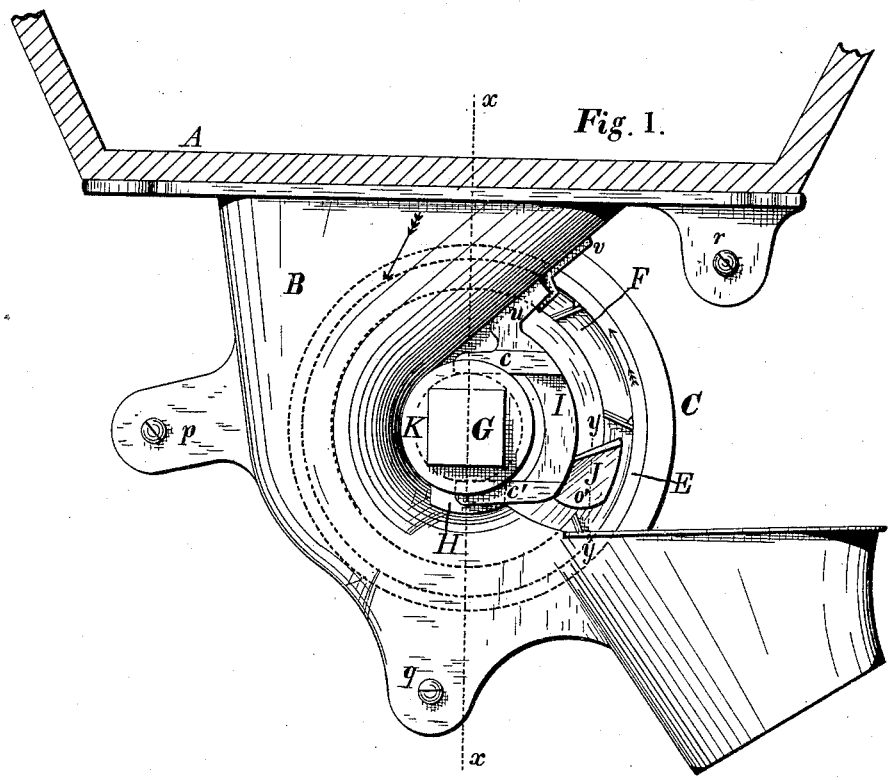
Figure 2:
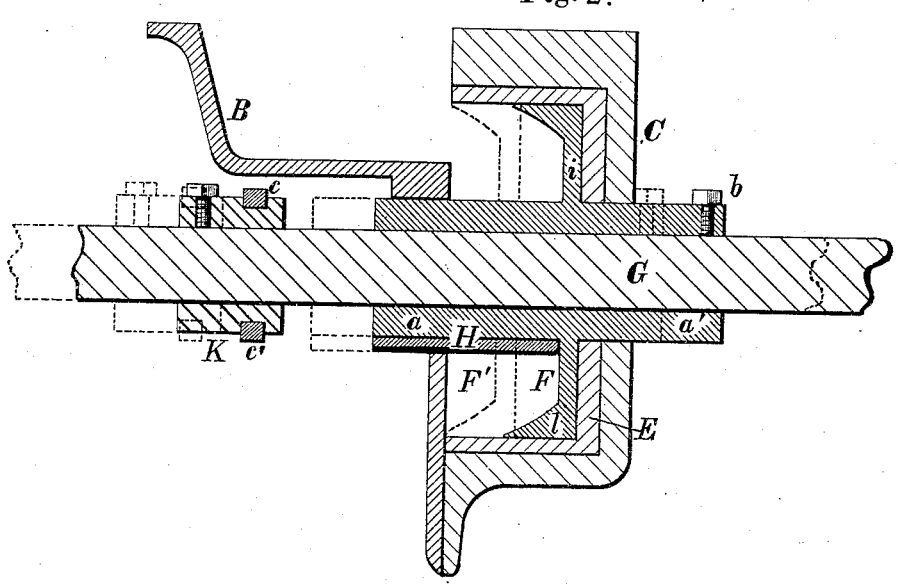

In the accompanying drawings, representing my invention, Figure 1 is an end elevation. Fig. 2 is a longitudinal section on the line $x\,x$, Fig. 1. Fig. 3 is a side elevation. Fig. 4 is an end view of the adjustable distributer. Fig. 5 represents the movable partition. Fig. 6 is an end elevation of my improvement as seen from the right hand in Fig. 3. Fig. 7 is a partial face view of the feed-shell. Fig. 8 is an elevation showing the interior of that portion of the case seen on the left hand in Fig. 3. Fig. 9 is a plan view. Fig. 10 is a section through the deflector on the line $y\,y$, Fig. 1.

In my improved seed-drill I secure the delivery of seed or grain at a variable rate of speed by means of a revolving adjustable distributer of peculiar construction, which is arranged to be adjusted lengthwise upon or with the shaft which carries it, so as to increase or decrease the size of the throat between the distributer and the casing which incloses it, for the purpose of varying the rate of the discharge of the seed or grain.

In the accompanying drawings my improved distributer is shown in section in Fig. 2 and in elevation in Fig. 4. It consists of a cylindrical shell, E, closed at one end, and having the adjustable feed-wheel F located within it. The feed-wheel F is provided with hubs $a\,a'$, projecting each way from the disk $i$, Fig. 2, and one of which hubs is secured to the driving-shaft G by a set-screw or other suitable device, $b$. Around the margin of the disk $i$ is the flange $l$, the inner surface of which is beveled or flared outward, as represented in the drawings, to facilitate the discharge of the seed or grain. The interior curved surface of the shell E is provided with one or more ribs or projections, $n\,n$, which extend in a direction parallel with the shaft G, and fit into corresponding notches in the exterior of the feed-wheel F, and cause the shell to revolve with the wheel when the shaft G is turned. The beveled surface of the flange $l$ is preferably provided with a series of ribs or projections, $o$, Fig. 4, which, as the wheel revolves, serve to carry the grain along with it. The wheel is arranged to be adjusted lengthwise on or with the shaft G, as indicated by the full and dotted lines in Fig. 2. The dotted lines F' represent the position of the wheel when the feed is reduced to its minimum, the throat or opening between it and the inner surface of the casing B being of the smallest dimensions.

In the accompanying drawings, A represents in section the hopper of a drill to which my improvement is attached, the casings B and C being provided with suitable flanges, which are secured to the lower side of the bottom of the hopper.

The number of the feeding devices employed in any given case corresponds with that of the hoes used on the drill, each seeder being provided with a spout or discharge-passage, D D', through which the grain is delivered to the corresponding hoe. Any number of seeding devices may be operated by the shaft G.

The casings B and C are provided with suitable lugs, $p\,q\,r$, Fig. 1, by which they are connected together. The case B is provided with an opening on its upper surface, which corresponds with an opening in the bottom of the hopper, the channel in the case through which the grain descends, as indicated by the arrows in Figs. 1 and 8, being continually reduced in size from above downward, until at its lower extremity it curves around below the ring $s$, in order to deliver the grain to the action of the feed-wheel F. The adjustment of the feed-wheel lengthwise of the shaft will increase or diminish the horizontal dimensions of the throat between the wheel and the casing B, and in order to keep the vertical dimensions always the same, whatever position the feed-wheel may occupy, I employ a movable partition, I, which is so connected to the shaft or the wheel as to be moved or adjusted therewith. The movable partition I also carries the deflector J, Figs. 1 and 8, which corresponds in shape with the inner curved surface of the flange $l$ on the feed-wheel, effects the discharge of the grain into the spout D D', and prevents any of the grain from being carried upward by the revolution of the wheel.

The partition I is provided with one or more arms, $c\ c'$, the outer ends of which are bent toward the shaft G and engage with a groove, $z$, in the said shaft, or in a collar, K, attached thereto, so as to cause the partition to move backward and forward with the feed-wheel when the latter is adjusted. The inner end of the partition extends inward to the disk $i$ of the feed-wheel. The lower edge of the partition is bent inward underneath the shaft, forming the curved plate or abutment H, which occupies the space of a segment cut away from the ring $s$.

The upper edge of the movable partition I is formed into a flange, $u$, which conforms to the inclined surface of the case B at this point, and is secured thereto by a clip, $v$, Figs. 1 and 8. The casing B below the shaft is made of a form adapted to permit the abutment H to move lengthwise with the shaft G.

The outer surface of the deflector J is grooved or recessed, as indicated at $o'$, in order to enable it the better to perform its function of separating the grain or seed from the feed-wheel and of preventing any of it from being carried upward.

The shaft G may be round or square, as preferred. In the latter case I turn down a portion of it and cut a number of fine equidistant grooves in the round surface, as indicated at L, Fig. 3, and arrange a pointer, N, attached to the hopper or other convenient part of the machine, so that the rate at which the machine is feeding may be indicated by the position of the grooves relative to the pointer.

My improved adjustable feed device may be inclosed within a case of any suitable form, although I prefer to use a casing of substantially such shape as indicated in the drawings.

By the use of my improved adjustable feeding device I am enabled to dispense with any series of change-gears or variable-speed gearing, such as is ordinarily employed on grain-drills for the purpose of varying the rate of the delivery.

Any suitable mechanical device may be employed in connection with my invention to shift the shaft G lengthwise and to secure it in any position to which it may be adjusted.

I hereby disclaim anything shown in the patents of Fulgham, April 5, 1881, No. 239,760; Esler, reissue, April 12, 1881, No. 9,661; Bartlett, December 20, 1881, No. 251,160; Allen, July 17, 1883, No. 281,602, and Smith, August 25, 1885, No. 325,125.

I claim—

1. The combination, in a seed-drill, of a suitable casing and a revolving laterally-adjustable distributer consisting of revolving shell E and feed-wheel F, substantially as described.

2. The combination, with the laterally-adjustable revolving feed-wheel F, of the shell E, arranged to receive motion from the wheel, substantially as described.

3. The combination, with the longitudinally-adjustable shaft G, of the feed-wheel F, secured thereto, and the shell E, provided with one or more ribs, $n$, fitting a corresponding notch or notches in the wheel, substantially as described.

4. The combination, with the longitudinally-adjustable shaft G, feed-wheel F, provided with hubs $a\ a'$, and flange $l$, of the shell E, arranged to be rotated by the wheel, substantially as described.

5. The combination, with the laterally-adjustable feed-wheel F, provided with hubs $a\ a'$ and flange $l$, of the revolving shell E and the casing B C, having suitable inlet and discharge passages for the grain and a recess within which the shell revolves, substantially as described.

6. The combination, with the laterally-adjustable revolving feed-wheel F, of the revolving shell E and movable partition I, substantially as described.

7. The combination, with the laterally-adjustable revolving feed-wheel F, of the revolving shell E and movable partition I, provided with deflector J, substantially as described.

8. The combination, with the longitudinally-adjustable shaft G, of the feed-wheel F, secured thereto, the revolving shell E, and movable partition I, connected with the shaft so as to be adjusted therewith, substantially as described.

9. The combination, with the longitudinally-adjustable shaft G, of the feed-wheel F, secured thereto, the revolving shell E, movable partition I, having one or more arms, $c$, arranged to engage with groove $z$, in order to secure the simultaneous adjustment of the feed-wheel and partition, substantially as described.

10. The combination, with the revolving shell E, provided on its inner surface with a series of ribs, $n$, of the laterally-adjustable feed-wheel F, having a series of notches in its circumference adapted to receive the said ribs, and a series of projections, $o$, on the inner beveled surface of the flange $l$, substantially as described.

11. The combination, with the revolving shell E, of the laterally-adjustable feed-wheel F and the movable partition I, provided with deflector J, having groove $o'$, substantially as described.

12. The combination, in a grain-drill, of the revolving shell E, feed-wheel F, and longitudinally-adjustable shaft G, having indicator L and pointer N, substantially as described.

13. The combination, with the revolving shell E, of the laterally-adjustable flanged feed-wheel F, arranged within the shell and adapted to form a throat or grain-discharge passage of variable dimensions within the shell by its adjustment to and from the opposing surface of the case, substantially as described.

14. The combination, with the revolving shell E, of the laterally-adjustable feed-wheel F and movable partition I, provided with plate H, substantially as described.

EDSON J. CORSER.

Witnesses:
 H. L. DOUBLEDAY,
 FRED. C. JOHNSON.